US012024080B2

(12) United States Patent
Evans et al.

(10) Patent No.: US 12,024,080 B2
(45) Date of Patent: Jul. 2, 2024

(54) SYSTEM FOR AN ASSIST POCKET

(71) Applicant: TOYOTA MOTOR ENGINEERING & MANUFACTURING NORTH AMERICA, INC., Plano, TX (US)

(72) Inventors: George Evans, Ann Arbor, MI (US); William Patrick Garrett, Plano, TX (US); Philip Babian, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/672,484

(22) Filed: Feb. 15, 2022

(65) Prior Publication Data
US 2023/0256880 A1    Aug. 17, 2023

(51) Int. Cl.
*B60N 3/02*      (2006.01)
*B62D 25/04*    (2006.01)
*B60P 1/28*      (2006.01)
*B66F 9/065*    (2006.01)
*B66F 9/22*      (2006.01)

(52) U.S. Cl.
CPC ............. *B60N 3/02* (2013.01); *B62D 25/04* (2013.01); *B60P 1/286* (2013.01); *B66F 9/0655* (2013.01); *B66F 9/22* (2013.01)

(58) Field of Classification Search
CPC .......... B60N 3/02; B60P 1/286; B66F 9/0655; B66F 9/22; B62D 25/04
USPC ............................ 296/1.02, 1.08, 71, 193.06
See application file for complete search history.

(56) References Cited

U.S. PATENT DOCUMENTS

| 4,580,821 | A | 4/1986 | Genord, Jr. |
| 8,297,645 | B2 * | 10/2012 | Thurston ............... B60R 13/025 296/193.06 |
| 8,371,632 | B2 | 2/2013 | Akaba |
| 8,419,117 | B2 | 4/2013 | Stephens |
| 9,656,585 | B2 * | 5/2017 | Astrike .................. B60N 3/026 |
| 10,053,893 | B1 | 8/2018 | Patel |
| 2011/0291435 | A1 * | 12/2011 | Matusko ................ B60N 3/026 296/1.08 |
| 2022/0388460 | A1 * | 12/2022 | Yamane ............. B60R 13/0243 |

FOREIGN PATENT DOCUMENTS

| CN | 213565729 U | 6/2021 |
| JP | 4735131 B2 | 7/2011 |

OTHER PUBLICATIONS

The Home Depot, "A Pillar Trim Panel With Grab Handle Right Beige," The Home Depot, Sep. 17, 2021 (https://www.homedepot.com/p/A-Pillar-Trim-Panel-With-Grab-Handle-Right-Beige-97630/311987055).

Weston Body Hardware, "G13 Double-Sided Flush-Fit Grab Handles," Weston Body Hardware, Sep. 17, 2021 (http://www.westonbodyhardware.com/portfolio_item/g13-double-sided-flush-fit-grab-handles/).

* cited by examiner

*Primary Examiner* — Amy R Weisberg
*Assistant Examiner* — Dana D Ivey
(74) *Attorney, Agent, or Firm* — SHEPPARD, MULLIN, RICHTER & HAMPTON LLP; Daniel N. Yannuzzi

(57) ABSTRACT

Systems are provided for an assist pocket. In particular, an assist pocket formed into a vehicle pillar. Certain embodiments of the assist pocket may include a depression formed into the vehicle pillar dimensioned to accept fingers of an occupant, where a grip is formed along an edge of the depression and extends partially over the pocket. The assist pocket may be formed to help occupants ingress and egress a vehicle.

9 Claims, 3 Drawing Sheets

SYSTEM FOR AN ASSIST POCKET

TECHNICAL FIELD

The present disclosure relates generally to vehicle pillar handles, and in particular, some implementations may relate to a vehicle pillar assist pocket that provides a hand grip for a vehicle occupant and that avoids obstructing a view through the vehicle's windows.

DESCRIPTION OF RELATED ART

Many vehicles include multiple hand holds or grips distributed on the A-pillar, B-pillar, and C-pillar, for example. The grips distributed inside the vehicle may help passengers ingress or egress the vehicle. The grips typically extend outward from the pillar and allow for a hand to pass through an opening between a strap, or other handle of the grip, and the pillar. These grips are problematic because they can reduce the field of vision a driver, passenger, or occupant may have when looking past the vehicle pillar.

BRIEF SUMMARY OF THE DISCLOSURE

According to various embodiments of the disclosed technology an assist pocket is disclosed herein. In various embodiments, the system may comprise a vehicle pillar (e.g., an A-, B- or other pillar), a pocket formed into the vehicle pillar, and a grip extending from the pocket. In some embodiments, the pocket may be a depression formed in the vehicle pillar. In further embodiments, the pocket may have a grip suitable for grasping by a passenger, such as upon ingress/egress of the vehicle. In embodiments, the grip may include a finger retention portion and a palm resting portion. The finger retention portion of the grip may allow for an occupant's finger(s) to curl around and grip it. In some embodiments, the grip may also include a palm resting portion located on a surface, which may be externally aligned with the vehicle pillar, where the surface forms the palm resting portion of the grip. The palm resting portion may allow for a passenger to rest their palm. An outer surface of the palm resting portion may be flush with the pillar surface, extend beyond the pillar surface, or be recessed within the pillar surface. In various embodiments, the grip may be formed to receive a hand of the occupant.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The FIGS. are provided for purposes of illustration only and merely depict typical or example embodiments.

The figures are not exhaustive and do not limit the present disclosure to the precise form disclosed.

DETAILED DESCRIPTION

Embodiments of the systems disclosed herein can provide an assist pocket for ingress and egress of a vehicle. Many vehicles in operation include various grips and hand holds on vehicle pillars that help drivers, passengers, and/or occupants of the vehicle ingress and egress the vehicle. However, conventional grips will restrict a driver or passenger's vision around the pillar, as conventional grips protrude from the vehicle pillar in a manner that blocks a portion of the field of vision on the windshield or side windows.

Various embodiments of the present disclosure improve upon existing technology by creating an assist pocket formed into the vehicle pillar, where the pocket includes a depression formed within the vehicle pillar (e.g., A-, B- or C-pillar), wherein a portion of the assist pocket includes an extended element to form a grip portion. The grip portion may include a finger retention portion, the finger retention portion of the grip may include a section about which a finger or fingers of an occupant can by curled to grasp the pillar. In various embodiments, the grip portion may also include a palm resting portion, and a surface of the palm resting portion of the grip may be flush with the vehicle pillar surface, extend beyond the pillar surface, or be recessed within the pillar surface. The palm resting portion of the grip may be configured to allow a palm of the occupant to be placed in a resting manner. In various embodiments, the assist pocket is formed to receive a hand of an occupant.

The present disclosure provides a novel solution to vehicle pillar handholds as it creates an assist pocket that avoids impacting (or reduces the impact of) the field of vision of the driver, passenger, and/or occupants. Moreover, various embodiments of the assist pocket provide a novel design and utility by forming a grip along an edge of the pocket that may include a finger retention portion internal to the vehicle pillar, and a palm retention portion using the body or external surface of the vehicle pillar. The assist pocket may be formed with the pillar as an integrated, unitary structure (i.e., the pillar, depression and grip portion are molded or otherwise formed as a single unit), or parts or all of the assist pocket may be formed as a unit or units separate from the pillar that can be installed into/onto the pillar.

Figure 1:
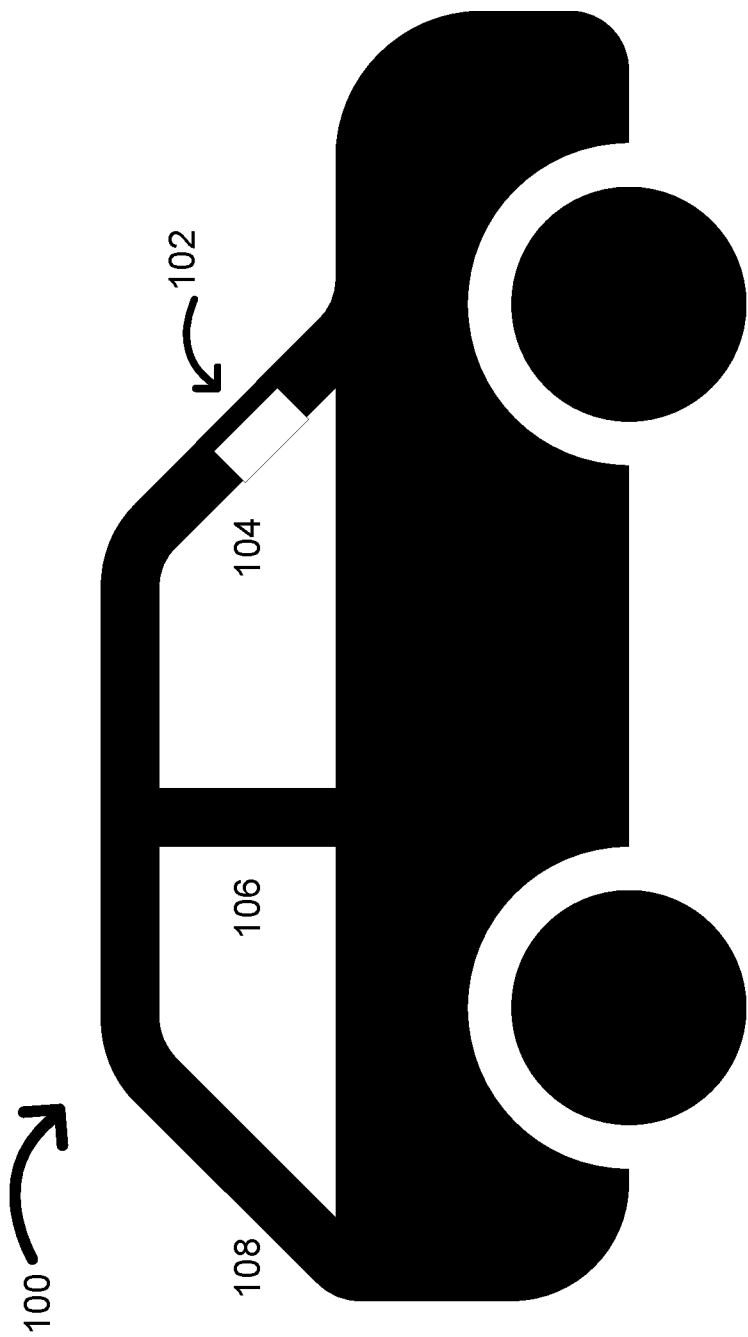
FIG. 1 is an exemplary side-view of a vehicle with a vehicle pillar.

FIG. 1. is an exemplary side-view of a vehicle 100 with which various embodiments of the assist pocket 102 may be implemented. In the example of FIG. 1, a vehicle 100 may include three pillars on each side of the vehicle 100. In the vehicle 100, pillars may be the roof support structures along either side of the vehicle 100. The A-pillar 104 may be located between the front side windows and the windshield (not shown). The B-pillar 106 may be located in between the front side window and the rear passenger window. The C-pillar 108 may be located between the rear passenger window and the rear view window (not shown). In the example illustrated in FIG. 1, the assist pocket 102 is located on A-pillar 104 of the vehicle. Assist pocket 102 may be positioned at other points along the A-pillar 104, on other vehicle pillars 106, 108, or other locations of the vehicle 100. In certain embodiments, the assist pocket 102 may be located on the A-pillar 104. In certain embodiments, the assist pocket 102 may be located on the B-pillar 106. In certain embodiments, the assist pocket 102 may be located on the C-pillar 108. In other embodiments assist pockets 102 may be located on any combination of two or more of the A-pillar 104, B-pillar 106, and C-pillar 108.

The systems disclosed herein may be implemented with any of a number of different vehicles and vehicle types. For example, the systems disclosed herein may be used with automobiles, trucks, recreational vehicles, and other on-or off-road vehicles. In addition, the principals disclosed herein may also extend to other vehicle types as well.

Figure 2:
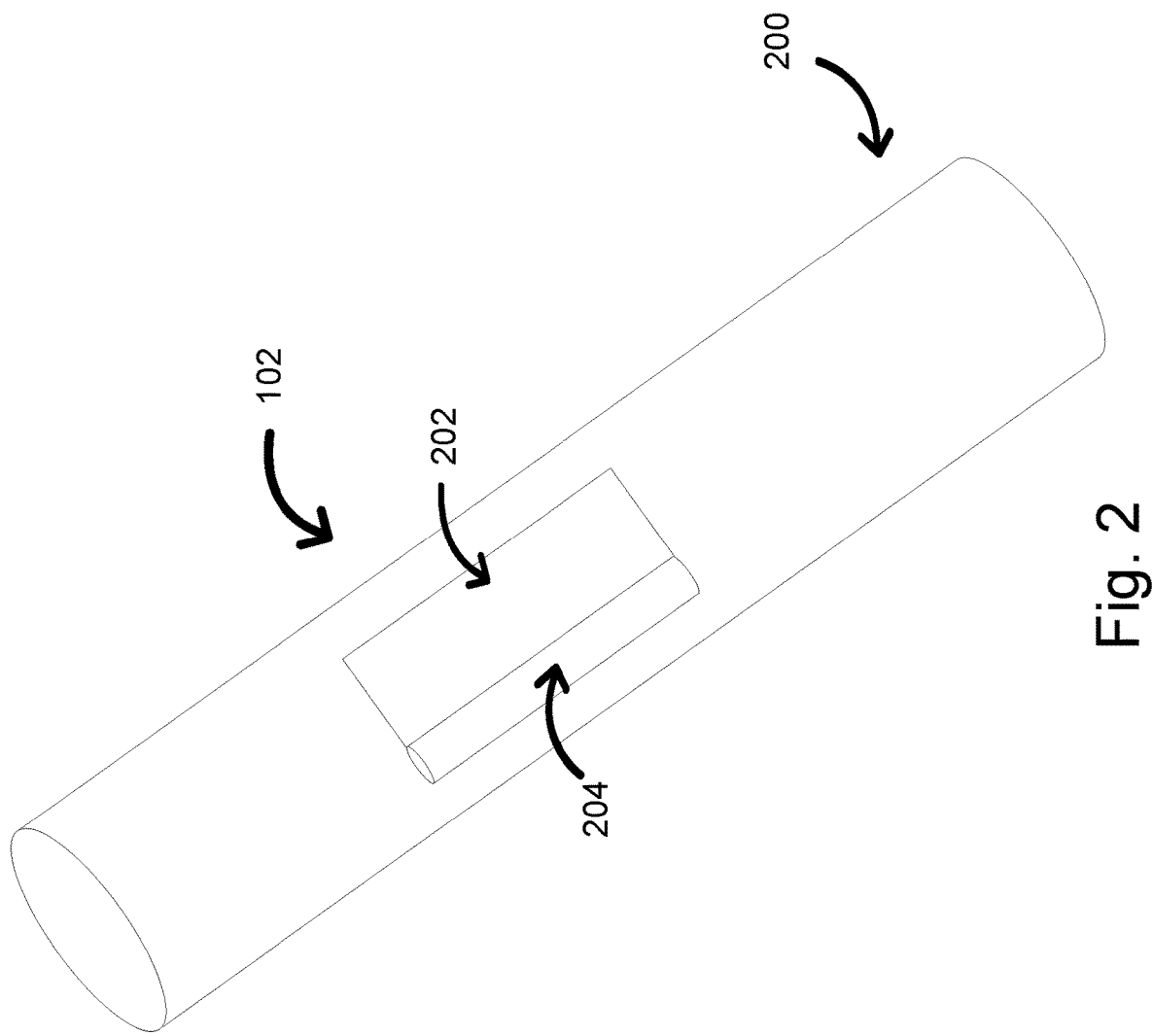
FIG. 2 is an example of a vehicle pillar with an assist pocket forming a depression and a grip.
Figure 3:
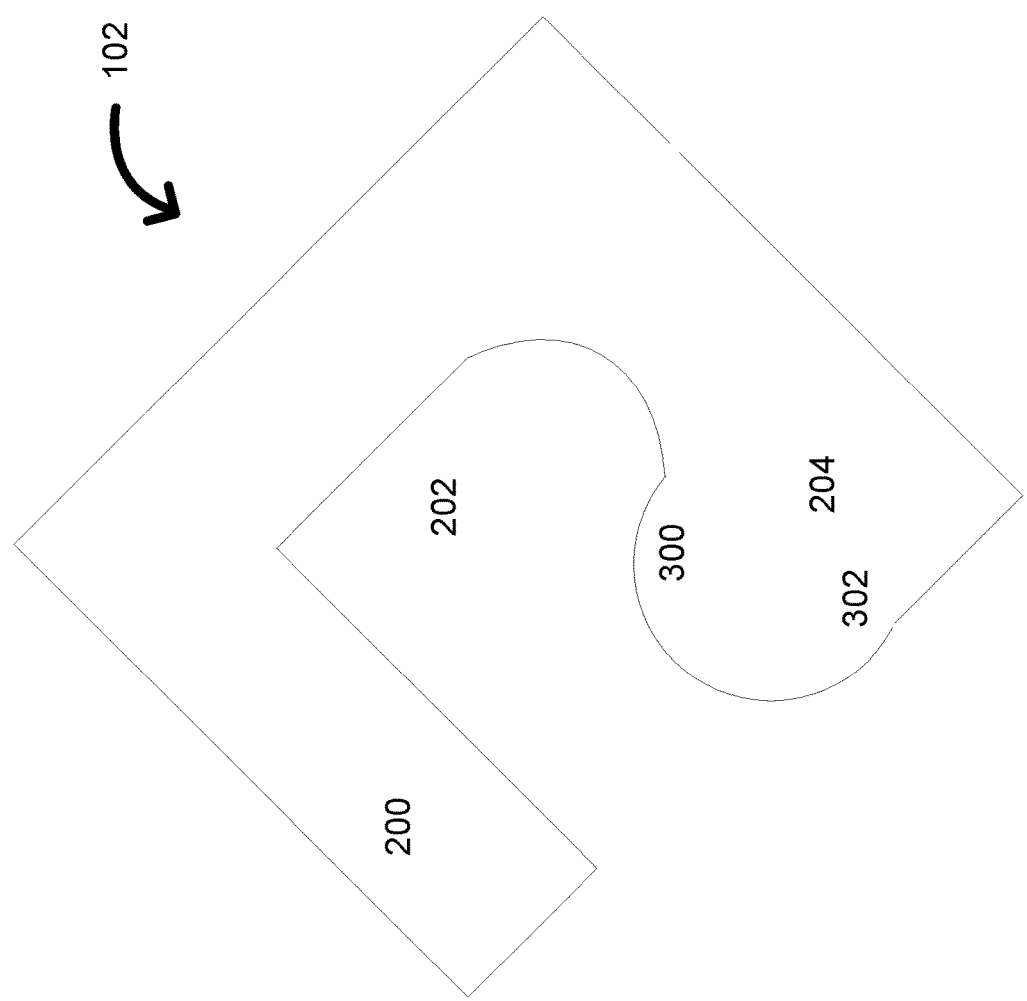
FIG. 3 is a cross-sectional view of an example assist pocket.

FIG. 2 illustrates an example of a vehicle pillar with an assist pocket 102 forming a depression 202 and a grip 204. FIG. 3 is a cross-sectional view of an example assist pocket, which illustrates the grip 204 with a finger retention portion 300 and a palm retention portion 302. Referring now to FIGS. 2 and 3, in various embodiments of the present disclosure, an assist pocket 102 may be formed into a vehicle pillar 200 (e.g., A-pillar 104 in the example of FIG. 1). In certain embodiments, the assist pocket 102 may be located on an internally facing surface of the vehicle pillar 200. The assist pocket 102 may be formed by a depression 202 into the vehicle pillar 200. In embodiments, the depression 202 may be 1 centimeter (cm) to 10 cm deep.

In some embodiments, the assist pocket 102 may be angled into the surface of the vehicle pillar 200. In some embodiments, the assist pocket 102 may be located in or near the middle (top to bottom) of the vehicle pillar 200. In other embodiments, the assist pocket 102 may be located near a roof of the vehicle (not shown) on the surface of the vehicle pillar 200. In other embodiments, the pocket may be located toward the bottom and of the vehicle pillar 200. In some embodiments, there may be one assist pocket 102 on the surface of the vehicle pillar 200. In other embodiments, there may be multiple assist pockets 102 on the surface of the vehicle pillar 200.

In various embodiments of the present disclosure, a grip 204 may run along an edge of the depression 202, and may partially enclose the depression 202. In certain embodiments, the grip 204 may extend from an internally facing surface of the pocket 102. In other embodiments, the grip 204 may extend from a surface of the vehicle pillar 200. In some embodiments, the grip 204 may be angled within the pocket 102, and may provide for stronger contact between a hand of an occupant and the grip 204. In some embodiments, the grip 204 may run along a portion of an edge of the depression 202. In other embodiments, the grip 204 may run along the entirety of an edge of the depression 202. In further embodiments, the grip 204 may run along two or more edges of the depression 202.

In various embodiments of the present disclosure, a boundary of the assist pocket 102 may be located at the surface of the vehicle pillar 200. In various embodiments, the assist pocket 102, may be formed by a depression in the surface of the vehicle pillar 200. In some embodiments, the assist pocket 102 may have a depth of 1 cm to 20 cm. In other embodiments, other depression depths may be used. In some embodiments, depression 202 may be of uniform or varying depth. In some embodiments, the assist pocket 102 may have a width of 5 cm to 50 cm. In some embodiments, the assist pocket 102 may have a height of 5 cm to 25 cm. In other embodiments, other heights and widths may be used.

In various embodiments, the assist pocket 102 may be located 2 cm to 70 cm from the top of the vehicle pillar 200. In various embodiments, the assist pocket 102 may be located 2 to 70 cm from the base of the vehicle pillar 200. In other embodiments, there may be two or more assist pockets 102 that may be spaced between 1 cm and 60 cm from each other. In further embodiments, other placements and spacings may be used. In some embodiments, the grip 204 may extend 1 cm to 10 cm from the edge of the depression 202, however other dimensions may be used.

As illustrated in FIG. 3, the example grip 204 further includes a finger retention portion 300 and a palm retention portion 302. In some embodiments, the finger retention portion 300 may extend from an edge of the grip 204. In some embodiments, an occupant may insert their finger into the assist pocket 102, curl their finger around the finger retention portion 300 of the grip 204, and rest the palm of their hand on the palm retention portion 302 of the grip 204. In some embodiments, the occupant may apply weight to the grip 204 once they have secured their finger around the finger retention portion 300 of the grip 204. In various embodiments, the grip 204 may support between 2 kilogram (kg) and 200 (*kg*). In some embodiments, the assist pocket 102 may assist occupants ingress/egress the vehicle 100. In some embodiments, the assist pocket 102 may disperse the weight of an occupant, which may effectuate an increase in occupant stability. In some embodiments, the assist pocket 102 may strengthen the occupant's position while seated in the vehicle 100.

In various embodiments of the present disclosure, the finger retention portion 300 of the grip 204 may include a curved surface of constant or varying diameter about which an occupant may wrap their finger(s). In various embodiments, the curved surface may curve around towards the interior of the depression 202 to increase the occupant's hold on the grip 204. In some embodiments, the recurve portion is contoured to the shape of the occupant's hand and may include recesses within which an occupant's fingers may rest. In embodiments, the radius of the curved surface may range from 0.5 cm to 5 cm, although other radii are possible.

In various embodiments, the grip 204 may include a palm resting portion 302, which may be flush with the surface of the vehicle pillar 200. In other embodiments, the palm resting portion 302 of the grip 204 may extend beyond the surface of the vehicle pillar 200. In other embodiments, the palm resting portion 302 of the grip 204 may be recessed within the surface of the vehicle pillar 200. In other embodiments, the palm resting portion 302 may allow for the occupant to rest their palm on the vehicle pillar 200. In various embodiments, the palm resting portion 302 may be configured to allow the palm of the occupant to be placed in a resting manner. In various embodiments, the palm resting portion 302 may allow for the occupant to rest a portion or the entirety of their palm.

In various embodiments, the assist pocket 102 may be externally aligned with the vehicle pillar 200, such that the depression 202 and the grip 204 are entirely formed within the vehicle pillar 200. In some embodiments, the assist pocket 102 may be flush with the vehicle pillar 200, such that the assist pocket 102 does not impact the field of vision for the occupants of the vehicle around the vehicle pillar 200. In some embodiments, the assist pocket 102 may expand the field of vision to the boundary or surface of the vehicle pillar 200, allowing for a wider field of vision for occupants over conventional vehicle pillar hand holds.

In various embodiments, the assist pocket 102 may be formed to receive the hand of the occupant. In some embodiments, the assist pocket 102 may include contouring that may conform to the shape of the hand of the occupant.

The examples of FIGS. 2 and 3 are provided for illustration purposes only as examples of vehicle systems with which embodiments of the disclosed technology may be implemented. One of ordinary skill in the art reading this description will understand how the disclosed embodiments can be implemented with vehicle platforms.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A passenger grip system for a vehicle, comprising:
a pocket formed in an interior facing surface of a vehicle pillar, wherein the pocket comprises:
   a depression formed in the vehicle pillar dimensioned to accept fingers of an occupant; and
   a grip formed along one edge of the depression and extending partially over the pocket, the grip forming a finger retention portion and a palm resting portion, the grip providing support against which a user may brace themself upon entry into or egress from the vehicle;
   wherein the finger retention portion of the grip comprises a continuously curved section extending from an innermost location of the finger retention portion to the palm resting portion, the curved section connecting the interior facing surface of the vehicle pillar to an interior facing surface of the depression and occupying a portion of the depression; and
   wherein the palm resting portion comprises a section to accept a palm of the occupant's hand.

2. The system of claim 1, wherein the pocket is formed entirely within the vehicle pillar.

3. The system of claim 1, wherein the surface of the vehicle pillar includes the palm resting portion of the grip.

4. The system of claim 1, wherein the grip includes one or more contours for conforming to the shape of the hand of the occupant.

5. The system of claim 1, wherein a surface of the palm resting portion of the grip is flush with the pillar surface.

6. The system of claim 1, wherein a surface of the palm resting portion of the grip extends beyond the pillar surface.

7. The system of claim 1, wherein a surface of the palm resting portion of the grip is recessed within the pillar surface.

8. The system of claim 1, wherein the grip is angled within the pocket.

9. A vehicle, comprising:
a vehicle pillar; and
a pocket formed in an interior facing surface of the vehicle pillar, wherein the pocket comprises:
   a depression formed in the vehicle pillar dimensioned to accept fingers of an occupant; and
   a grip formed along one edge of the depression and extending partially over the pocket, the grip forming a finger retention portion and a palm resting portion, the grip providing support against which a user may brace themself upon entry into or egress from the vehicle;
   wherein the finger retention portion of the grip comprises a continuously curved section extending from an innermost location of the finger retention portion to the palm resting portion, the curved section connecting the interior facing surface of the vehicle pillar to an interior facing surface of the depression and occupying a portion of the depression; and
   wherein the palm resting portion comprises a section to accept a palm of the occupant's hand.

\* \* \* \* \*